(12) United States Patent
Takahashi et al.

(10) Patent No.: US 10,998,725 B2
(45) Date of Patent: May 4, 2021

(54) ELECTRIC POWER GENERATION PREDICTION METHOD BASED ON EXPECTED VALUE CALCULATION, ELECTRIC POWER GENERATION PREDICTION SYSTEM BASED ON EXPECTED VALUE CALCULATION, AND ELECTRIC POWER GENERATION PREDICTION PROGRAM PRODUCT BASED ON EXPECTED VALUE CALCULATION

(71) Applicant: HIDE HOUSING CORPORATION, Toyohashi (JP)

(72) Inventors: Hideyuki Takahashi, Aichi (JP); Yoshio Horiuchi, Aichi (JP)

(73) Assignee: Hide Housing Corporation, Aichi (JP)

( * ) Notice: Subject to any disclaimer, the term of this patent is extended or adjusted under 35 U.S.C. 154(b) by 0 days.

(21) Appl. No.: 16/623,704

(22) PCT Filed: Sep. 13, 2019

(86) PCT No.: PCT/JP2019/036017
§ 371 (c)(1),
(2) Date: Dec. 17, 2019

(87) PCT Pub. No.: WO2020/148941
PCT Pub. Date: Jul. 23, 2020

(65) Prior Publication Data
US 2020/0389026 A1  Dec. 10, 2020

(30) Foreign Application Priority Data

Jan. 18, 2019  (JP) .............................. JP2019-006478

(51) Int. Cl.
*G05B 19/042*  (2006.01)
*H02J 3/00*  (2006.01)
(Continued)

(52) U.S. Cl.
CPC ............ *H02J 3/004* (2020.01); *G05B 19/042* (2013.01); *H02J 3/381* (2013.01);
(Continued)

(58) Field of Classification Search
CPC ...... H02J 3/004; H02J 3/381; H02J 13/00006; H02J 2203/20; H02J 2300/24; H02J 13/00002; G05B 19/042; G05B 2219/2639
See application file for complete search history.

(56) References Cited

U.S. PATENT DOCUMENTS

2014/0207837 A1  7/2014  Taniguchi et al.
2018/0240048 A1*  8/2018  Wang ..................... G06Q 50/06
(Continued)

FOREIGN PATENT DOCUMENTS

CN  105023070  11/2015
CN  107732970  2/2018
(Continued)

OTHER PUBLICATIONS

Nakao, et al., "Optimal Operation Planning for Renewable Energy Management Based on Large-scale Simulation", Fujitsu, vol. 65, No. 2, Mar. 1, 2014, p. 28-33—with an English Abstract.
(Continued)

*Primary Examiner* — Yuhui R Pan
(74) *Attorney, Agent, or Firm* — Hamre, Schumann, Mueller & Larson, P.C.

(57) ABSTRACT

Accurately predicting a power generation of a natural energy power generation device that is affected by a peak cut loss. A processor of a computer is caused to execute: an insolation analysis step and a power generation prediction step. The power generation prediction step determines a first insolation that is the insolation required to obtain a first power generation that is zero and the minimum output power, and
(Continued)

a second power generation that is the capacity. The power generation prediction step also determines a second insolation that is the insolation in a case where the capacity is satisfied. In a case where the insolation is lower than the first insolation, the power generation prediction step determines the first power generation as the power generation, and in a case where the insolation exceeds the second insolation, the power generation prediction step determines the second power generation as the power generation.

3 Claims, 4 Drawing Sheets

(51) Int. Cl.
*H02J 3/38* (2006.01)
*H02J 13/00* (2006.01)

(52) U.S. Cl.
CPC . *G05B 2219/2639* (2013.01); *H02J 13/00002* (2020.01); *H02J 13/00006* (2020.01); *H02J 2203/20* (2020.01); *H02J 2300/24* (2020.01)

(56) References Cited

U.S. PATENT DOCUMENTS

| | | | |
|---|---|---|---|
| 2018/0240200 A1 | 8/2018 | Wang et al. | |
| 2018/0262011 A1* | 9/2018 | Itaya | H02J 3/381 |
| 2019/0064392 A1* | 2/2019 | Feng | G06F 17/18 |
| 2020/0099226 A1* | 3/2020 | Monforte | G01W 1/12 |

FOREIGN PATENT DOCUMENTS

| | | |
|---|---|---|
| CN | 108960491 | 12/2018 |
| JP | 2006-304402 | 11/2006 |
| JP | 2013-036820 | 2/2013 |
| JP | 2013-258796 | 12/2013 |
| JP | 2014-021555 | 2/2014 |
| JP | 2015-137903 | 7/2015 |
| JP | 2016-057090 | 4/2016 |
| JP | 2017-053804 | 3/2017 |
| JP | 2017-084360 | 5/2017 |
| JP | 2017-127140 | 7/2017 |
| WO | 2013/042213 | 3/2013 |

OTHER PUBLICATIONS

Yokoyama, et al., "A Method of Evaluating the Performance of a Stand-Alone Photovoltaic System in Consideration of its Probabilistic Characteristics", Transactions of the Japan Society of Mechanical Engineers, C, vol. 63, No. 608, pp. 191-198 (pp. 1229-1236)—with an English Abstract.

International Search Report and Written Opinion issued in International Application No. PCT/JP2018/036017, Nov. 19, 2019, 6 pages.

International Search Report and Written Opinion issued in International Application No. PCT/JP2018/036016, dated Oct. 29, 2019, 13 pages.

Office Action issued in corresponding Chinese Patent Application No. 201980003901.7, dated Feb. 3, 2021, 5 pages.

* cited by examiner

ELECTRIC POWER GENERATION PREDICTION METHOD BASED ON EXPECTED VALUE CALCULATION, ELECTRIC POWER GENERATION PREDICTION SYSTEM BASED ON EXPECTED VALUE CALCULATION, AND ELECTRIC POWER GENERATION PREDICTION PROGRAM PRODUCT BASED ON EXPECTED VALUE CALCULATION

TECHNICAL FIELD

The present invention relates to an electric power generation prediction method based on expected value calculation, an electric power generation prediction system based on expected value calculation, and an electric power generation prediction program product based on expected value calculation.

BACKGROUND ART

In a solar power generation system, which is one of natural energy power generation devices, a power generation that indicates an amount of electricity purchased and sold is affected by meteorological factors. Therefore, from the viewpoint of evaluating a profitability of the photovoltaic power generation system, an accurate prediction of a power generation is considered as one of important problems.

The power generation in the solar power generation system is determined in a complex manner by meteorological factors and electronic factors. Here, the meteorological factors include the influence of the weather on an insolation and the influence of aerosol on the insolation. Furthermore, the electronic factors include power generation characteristics corresponding to solar panels and the like and output characteristics corresponding to inverter devices and the like.

In the invention described in Patent Literature 1, a predicted power generation at the nearest future time is calculated on the basis of a calculated global insolation at the nearest future time based on the current time in fair weather and the most recent coefficient calculated from an actual measurement value of a photovoltaic power generation in the most recent past time interval from the current time to the most recent past time.

CITATION LIST

Patent Literature

Patent Literature 1: JP 2017-127140 A

SUMMARY OF INVENTION

Technical Problem

However, since the predicted power generation at the future time described in Patent Literature 1 is calculated on the basis of an average value of the most recent coefficient, it is difficult to accurately calculate the power generation on the basis of a calculation with conditional branching that considers the meteorological factors including uncertainty of the insolation and the electronic factors including electrical characteristics of a photovoltaic power generation device in a complex manner.

In a conventional method, a total amount of the insolation is determined from an average value of the insolation, and a power generation is predicted on the basis of the power generation efficiency of the power generation device and the total amount. Therefore, a peak cut loss due to the output characteristics is not accurately calculated, and it is difficult to accurately predict the power generation.

The present invention is performed in view of the above situations. It is problem to be solved to accurately predict an electric power generation of a natural energy power generation device that receives the influence of a peak cut loss.

Solution to Problem

For solving the above problem, the present invention is an electrical power generation prediction method based on expected value calculation causing a processor of a computer to execute: an insolation analysis step of determining an insolation per unit time and an insolation probability per unit time on the basis of insolation data; and a power generation prediction step of determining a power generation on the basis of the insolation and determining an expected value of the power generation on the basis of the power generation per unit time and the insolation probability per unit time corresponding to the insolation, in which on the basis of power generation characteristic data indicating the insolation and the power generation efficiency required to obtain minimum output power, and output characteristic data indicating capacity and output efficiency such that an excess becomes a peak cut loss, the power generation prediction step determines a first insolation that is the insolation required to obtain a first power generation that is zero and the minimum output power, and a second power generation that is the capacity, on the basis of the second power generation and the power generation efficiency, the power generation prediction step determines a second insolation that is the insolation in a case where the capacity is satisfied, in a case where the insolation is lower than the first insolation, the power generation prediction step determines the first power generation as the power generation, and in a case where the insolation exceeds the second insolation, the power generation prediction step determines the second power generation as the power generation.

By adopting such a configuration, the present invention is capable of simplifying the insolation influenced by meteorological factors including a plurality of factors on the basis of a probabilistic interpretation and capable of achieving an accurate prediction of the power generation on the basis of a calculation with conditional branching per insolation. Furthermore, by adopting such a configuration, the present invention further produces technological effects that statistical data on the insolation necessary for calculating the power generation can be simplified and a database load including data reference and data storage can be reduced. Furthermore, by adopting such a configuration, the present invention is capable of achieving the power generation calculation with conditional branching that considers the meteorological factors and electronic factors in a complex manner. Furthermore, by adopting such a configuration, the present invention has further technical effects that the power generation can be uniquely determined as a predetermined value on the basis of the insolation, and a calculation cost related to a power generation prediction can be reduced. Furthermore, by adopting such a configuration, the present invention is capable of setting a predetermined value of power generation dynamically on the basis of the performance of a power generation device including a solar panel and the performance of an output device including a power conditioner. Furthermore, by adopting such a configuration, the present invention has further technical effects that registered data in the database required for a power generation prediction is standardized and the database load including data reference and data storage can be reduced. Furthermore, by adopting such a configuration, the present invention is capable of setting a predetermined value of power generation dynamically on the basis of the performance of a power generation device including a solar panel and the performance of an output device including a power conditioner. Furthermore, by adopting such a configuration, the present invention has further technical effects that data registered in the database required for a power generation prediction is standardized and the database load including data reference and data storage can be reduced.

For solving the above problem, the present invention is an electric power generation prediction system based on expected value calculation including: an insolation analysis means of determining an insolation per unit time and an insolation probability per unit time on the basis of insolation data; and a power generation prediction means of determining a power generation on the basis of the insolation and determining an expected value of the power generation on the basis of the power generation per unit time and the insolation probability per unit time corresponding to the insolation, in which on the basis of power generation characteristic data indicating the insolation and the power generation efficiency required to obtain minimum output power, and output characteristic data indicating capacity and output efficiency such that an excess becomes a peak cut loss, the power generation prediction means determines a first insolation that is the insolation required to obtain a first power generation that is zero and the minimum output power, and a second power generation that is the capacity, on the basis of the second power generation and the power generation efficiency, the power generation prediction means determines a second insolation that is the insolation in a case where the capacity is satisfied, in a case where the insolation is lower than the first insolation, the power generation prediction means determines the first power generation as the power generation, and in a case where the insolation exceeds the second insolation, the power generation prediction means determines the second power generation as the power generation.

For solving the above problem, the present invention is an electric power generation prediction program based on expected value calculation causing a computer to function as: an insolation analysis means of determining an insolation per unit time and an insolation probability per unit time on the basis of insolation data; and a power generation prediction means of determining a power generation on the basis of the insolation and determining an expected value of the power generation on the basis of the power generation per unit time and the insolation probability per unit time corresponding to the insolation, in which on the basis of power generation characteristic data indicating the insolation and the power generation efficiency required to obtain minimum output power, and output characteristic data indicating capacity and output efficiency such that an excess becomes a peak cut loss, the power generation prediction means determines a first insolation that is the insolation required to obtain a first power generation that is zero and the minimum output power, and a second power generation that is the capacity, on the basis of the second power generation and the power generation efficiency, the power generation prediction means determines a second insolation that is the insolation in a case where the capacity is satisfied, in a case where the insolation is lower than the first insolation, the power generation prediction means determines the first power generation as the power generation, and in a case where the insolation exceeds the second insolation, the power generation prediction means determines the second power generation as the power generation.

Advantageous Effects of Invention

The present invention is capable of accurately predicting the power generation on the basis of the expected value calculation based on the calculation with conditional branching using the insolation probability per unit time.

DESCRIPTION OF EMBODIMENTS

Hereinafter, a system 1 according to the present invention will be described with reference to the drawings. Note that an embodiment described below is an example of the present invention, and the present invention is not limited to the following embodiment, and various configurations may be adopted. Furthermore, the system 1 is a system of accurately predicting a power generation on the basis of an expected value calculation.

In the present embodiment, a configuration, operation, and the like of the system 1 will be described. However, a method, a program, a recording medium, and the like having the same configuration also have similar operations and effects.

A program 2001 in the present embodiment is preferably recorded on a non-transitory recording medium, and is introduced into a computer apparatus 2 by using the recording medium.

A function related to the system 1 is achieved by using a calculator resource of the computer apparatus 2 in an application including the program 2001 stored in the computer apparatus 2. The application is achieved in a mode of installed software or cloud software.

Figure 1:
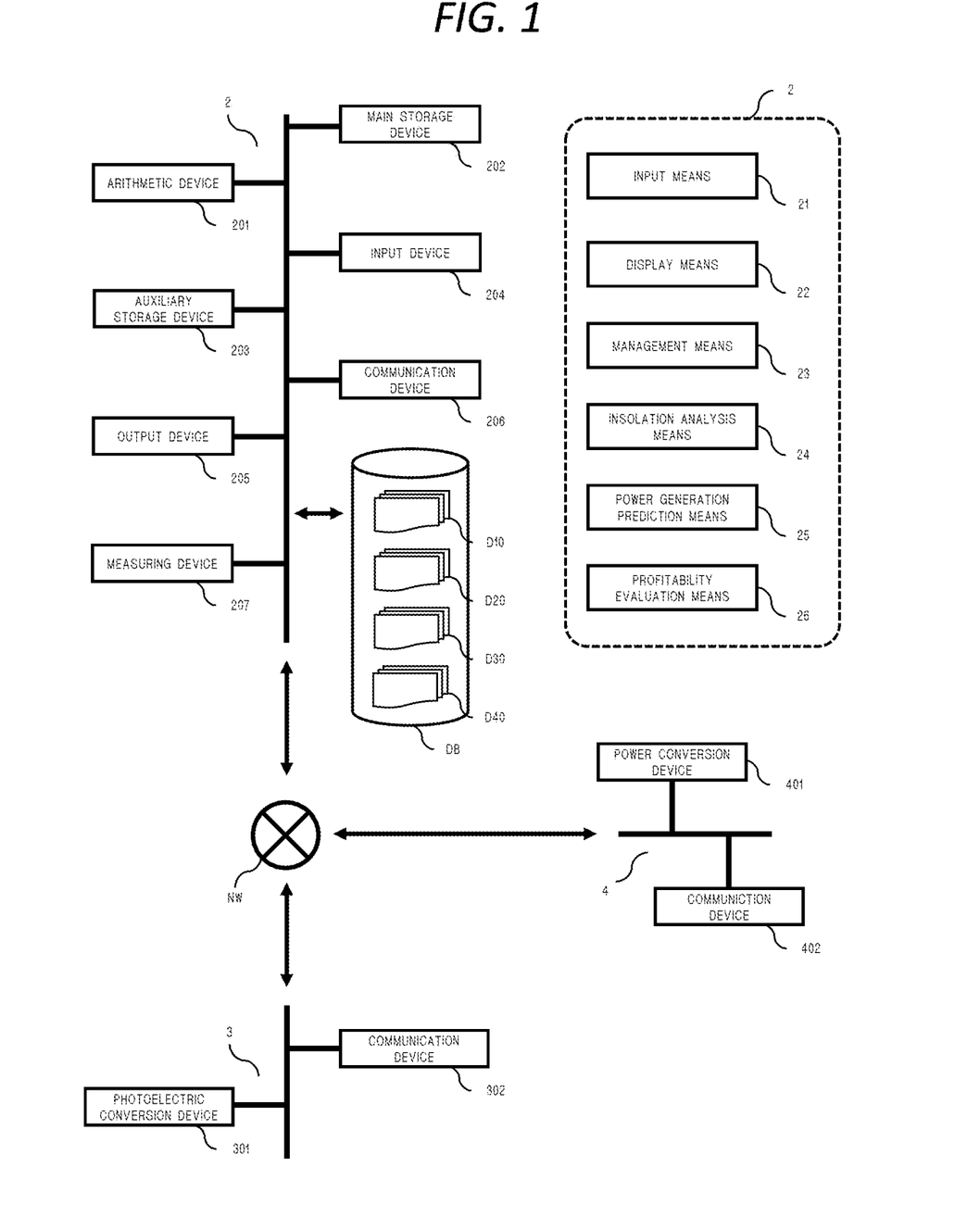
FIG. 1 is a hardware configuration diagram and a functional block diagram according to an embodiment of the present invention.

FIG. 1 illustrates a functional block diagram of the system 1 according to the embodiment of the present invention.

The system 1 includes the computer apparatus 2, a power generation device 3, and an output device 4. The computer apparatus 2 includes an input means 21, a display means 22, a management means 23, an insolation analysis means 24, a power generation prediction means 25, and a profitability evaluation means 26. Note that the system 1 may not include at least one of the power generation device 3 and the output device 4.

Functions and exerted effects related to the input means 21, the display means 22, the management means 23, the insolation analysis means 24, the power generation prediction means 25, and the profitability evaluation means 26 in the present embodiment are similar to functions and exerted effects related to an input step, a display step, a management step, an insolation analysis step, a power generation prediction step, and a profitability evaluation step, respectively.

The input means 21 is used for an input process related to the system 1. For example, the input means 21 is used for the input process of insolation data D10, power generation characteristic data D20, output characteristic data D30, and capital investment data D40. In the present embodiment, data subjected to the input process by the input means 21 is stored in a database DB in the computer apparatus 2.

The input means 21 may be configured to perform the input process via a network NW and an application programming interface in a plurality of computer apparatuses 2.

The display means 22 is used for a display process related to the system 1. For example, the display means 22 subjects various data stored in the database DB including the data subjected to the input process by the input means 21 to the display process. Furthermore, the display means 22 may be configured to subject a user interface for the input process to the display process. Note that the display process in the present embodiment may be performed by the plurality of computer apparatuses 2 cooperating on the basis on an object-oriented script language using JavaScript (registered trademark) as an example.

The management means 23 stores, in the database DB, at least one of the data subjected to the input process by the input means 21, data determined by the insolation analysis means 24, data determined by the power generation prediction means 25, and data determined by the profitability evaluation means 26.

The database DB in the present embodiment is constructed in a mode of a relational database, a column type database, or a key-value store. Note that the data in the database DB in the present embodiment may be encrypted on the basis of a one-way function.

The database DB in the present embodiment may be configured to be accessible via the network NW. Furthermore, the database DB may take a mode of a distributed database including a plurality of auxiliary storage devices 203.

The insolation analysis means 24 determines the insolation and the insolation probability on the basis of the insolation data D10. The insolation in the present embodiment preferably may refer to a global insolation and may be within the range of the global insolation. The insolation probability in the present embodiment refers to a probability of the insolation per unit time.

The power generation prediction means 25 determines the power generation on the basis of the insolation and determines an expected value of the power generation on the basis of the power generation and the insolation probability. The power generation is determined on the basis of the insolation and a light intensity corresponding to power generation efficiency included in the power generation characteristic data D20.

In a case where the insolation is lower than the first insolation, the power generation prediction means 25 determines a first power generation as the power generation. In a case where the insolation exceeds the second insolation, the power generation prediction means 25 determines a second power generation as the power generation. At this time, on the basis of at least the power generation efficiency included in the power generation characteristic data D20 and the output efficiency and a capacity included in the output characteristic data D30, the power generation prediction means 25 determines the first insolation and the first power generation, and the second insolation and the second power generation.

The power generation characteristic data D20 in the present embodiment includes at least the power generation efficiency and temperature characteristic data thereof.

The output characteristic data D30 in the present embodiment includes at least the output efficiency, temperature characteristic data thereof, and the capacity. The output efficiency includes information related to a loss coefficient related to output and minimum output power. The capacity in the present embodiment refers to a peak cut line P0.

The profitability evaluation means 26 determines profitability using an arithmetic device 201 on the basis of the capital investment data D40 and the expected value of the power generation. At this time, the capital investment data D40 includes a unit price of the power generation device including the power generation device 3, a unit price of the output device including the output device 4, the number of power generation devices including the power generation device 3, the number of output devices including the output device 4, a land price related to installation location of the power generation device, and a power selling price.

The profitability evaluation means 26 determines an investment amount using the arithmetic device 201 on the basis of the capital investment data D40 and determines a revenue using the arithmetic device 201 on the basis of the capital investment data D40 and the expected value of the power generation. The profitability evaluation means 26 determines a yield on the basis of the investment amount and the revenue and determines the profitability including a profitability index and an internal rate of return. Note that the profitability is determined for each of overloading rates related to the power generation device and the output device, and the profitability is stored in the database DB.

The profitability evaluation means 26 may determine the overloading rate at which the yield, the profitability index or the internal rate of return is maximized as a recommended overloading rate and store the overloading rate in the database DB. Various information determined by the profitability evaluation means 26 is subjected to the display process by the display means 22.

FIG. 1 is a hardware configuration diagram of the system 1 according to the embodiment of the present invention.

The computer apparatus 2 includes the arithmetic device 201, a main storage device 202, the auxiliary storage device 203, an input device 204, a display device 205, a communication device 206, and a bus interface for interconnection.

The power generation device 3 includes a photoelectric conversion device 301 and a communication device 302. The output device 4 includes a power conversion device 401 and a communication device 402. At this time, the power generation device 3 and the output device 4 are electrically connected.

The arithmetic device 201 includes a processor capable of executing an instruction set.

The main storage device 202 includes a volatile memory such as a random access memory (RAM).

In the present embodiment, the computer apparatus 2 may include a system on a chip (SoC) including the arithmetic device 201 and the main storage device 202. The SoC may include a coprocessor including an integrated circuit optimized for specific uses including encoding and machine learning.

The auxiliary storage device 203 is used as the database DB that is a storage destination of various data related to the system 1. The auxiliary storage device 203 includes a nonvolatile memory. As the nonvolatile memory, a hard disk drive may be used in addition to a semiconductor memory using a flash memory as an example, and the methods of recording to the hard disk drive, and a recording method of the nonvolatile memory is not limited.

In addition to the program 2001, the auxiliary storage device 203 stores an operating system (OS 2002) and a device driver corresponding to at least one of the input device 204, the display device 205, and the communication device 206.

The input device 204 is used for a user to perform the input process performed by the input means 21. The input device 204 includes a keyboard or a touch panel, and an input method of the input device 204 is not limited.

The display device 205 is used for the display process performed by the display means 22. The display device 205 includes a video memory that stores a frame buffer related to the display process and a display. Note that a driving method of the display in the present embodiment is not limited.

The communication devices 206, 302, and 402 are used to perform a communication process in the network NW via at least one of a wireless wide area network (WAN), a local area network (LAN), and a personal area network (PAN). The communication process is based on a wired communication standard or a wireless communication standard.

The computer apparatus 2 in the present embodiment may be configured not to include the input device 204 and the display device 205. Furthermore, a configuration in which the plurality of computer apparatuses 2 cooperates to achieve at least a part of the functions related to the system 1 may be adopted.

The photoelectric conversion device 301 includes at least a power generation unit and a supporting unit. The power generation unit converts solar energy into electric energy on the basis of a photovoltaic effect, and the semiconductor material of the power generation unit is not limited. The supporting unit is used at least to support the power generation part, and the material of the supporting unit is not limited. Furthermore, the photoelectric conversion device 301 may include a measurement unit for measuring the global insolation.

The power conversion device 401 includes at least a conversion unit and a supporting unit. The conversion part includes at least an inverter element for converting direct current power into alternating current power. The semiconductor material of the inverter element is not limited. The supporting unit is used at least to support the power generation part, and the material of the supporting unit is not limited.

The communication device 302 is used to transmit at least the power generation in the power generation device 3 and an actually measured insolation measured by the measurement unit to the computer apparatus 2.

The communication device 402 is used to transmit to the computer apparatus 2 at least information related to the power generation as direct current power supplied from the power generation device 3, and information related to the alternating current power converted by the conversion unit.

The network NW in the present embodiment uses, for example, transmission control protocol/internet protocol (TCP/IP) as a communication protocol. Note that the network NW can use a cable television (CATV) line, a mobile communication network, an aeronautical telecommunication network, and a satellite communication network, and the type of the network NW is not limited.

Figure 2:
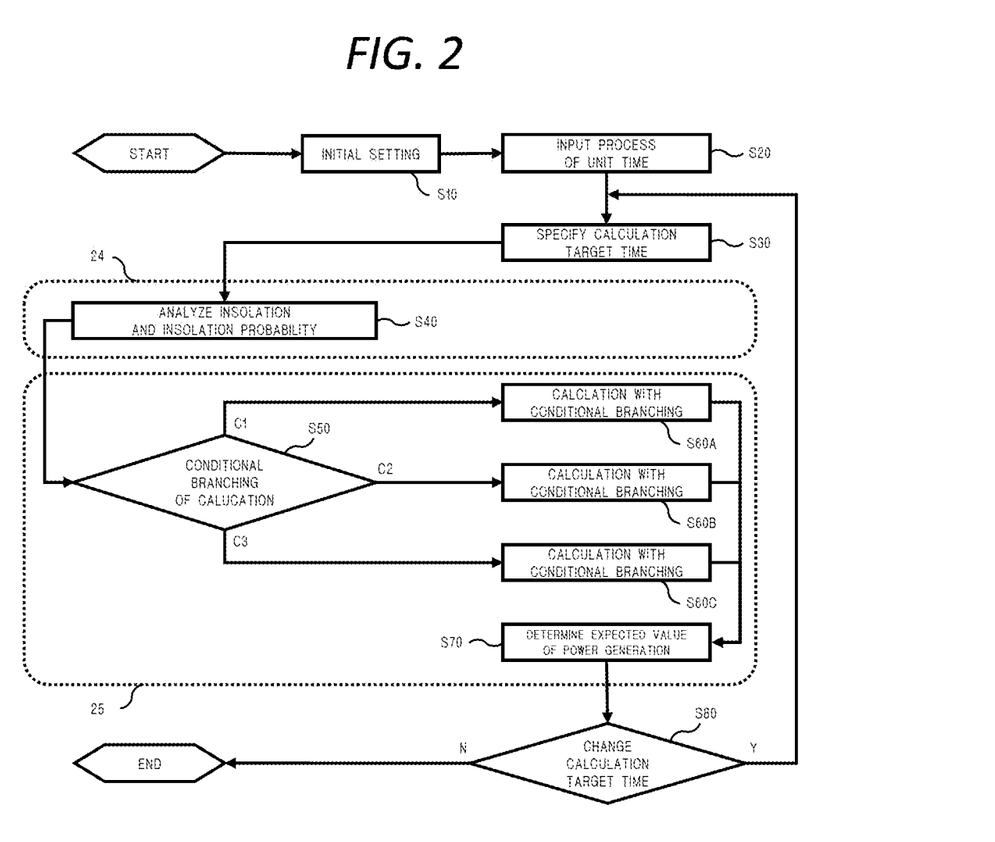
FIG. 2 is a process flowchart according to the embodiment of the present invention.

FIG. 2 is a process flowchart relating to a determination of the expected value of the power generation in the present embodiment.

In the present embodiment, the insolation data D10, the power generation characteristic data D20, and the output characteristic data D30 are first subjected to the input process or specified by the input means 21 as an initial setting (step S10). At this time, in a case where data already stored in the database DB is specified, the management means 23 performs a reference process for the data. In this step, geographic data may be configured to be subjected to the input process or specified by the input means 21, and the insolation data D10 corresponding to the geographic data may be configured to be referenced in the database DB.

The management means 23 determines and specifies the power generation characteristic data D20 on the basis of the data transmitted from the power generation device 3 to the computer apparatus 2. The management means 23 may determine and specify the output characteristic data D30 on the basis of the data transmitted from the output device 4 to the computer apparatus 2.

After step S10 is completed, the unit time and calculation target time are subjected to the input process or specified by the input means 21 (steps S20 and S30). The unit time in the present embodiment indicates the amount of a time range to be subjected to a power generation prediction. Furthermore, the calculation target time indicates a time zone to be subjected to the power generation prediction. Specifically, the unit time indicates a length of time such as one hour, and the calculation target time indicates a date and time such as 1 p.m. on January 1.

The insolation analysis means 24 determines an insolation probability distribution including the insolation and the insolation probability on the basis of the insolation data D10 subjected to the input process or specified, the unit time, and the calculation target time (step S40).

The power generation prediction means 25 performs the power generation calculation with conditional branching on the basis of the insolation probability distribution determined by the insolation analysis means 24.

In a case where the insolation included in the insolation probability distribution is lower than the first insolation (step S50, condition C1), the power generation is determined as the first power generation (step S60A). At this time, the first power generation is preferably zero. At this time, the insolation in a case where the power generation that satisfies the first power generation is obtained is determined as the first insolation. Specifically, the insolation required to obtain the minimum output power indicated by the output characteristic data D30 is determined on the basis of the power generation characteristic data D20. Note that in the present embodiment, the first insolation may be uniquely determined in a mode of performing the input process.

In a case where the insolation included in the insolation probability distribution is greater than or equal to the first insolation and less than or equal to the second insolation (step S50, condition C2), the power generation is determined on the basis of the insolation and the power generation efficiency in the power generation characteristic data D20 subjected to the input process or specified (step S60B).

In a case where the insolation included in the insolation probability distribution exceeds the second insolation (step S50, condition C3), the power generation is determined as the second power generation (step S60C). At this time, the second power generation is preferably the capacity included in the output characteristic data D30 subjected to the input process or specified. Furthermore, a configuration in which the insolation in a case where the power generation that satisfies the capacity is obtained is determined as the second insolation is preferable. The excess of the power generation related to the second power generation in the present embodiment indicates a peak cut loss. At this time, the second insolation is determined on the basis of the second power generation and the power generation efficiency in the power generation characteristic data D20. Note that in the present embodiment, the insolation may be uniquely determined in a mode of performing the input process.

The power generation prediction means 25 determines, as the expected value of the power generation, the sum of the product of the power generation obtained by the calculation with conditional branching, and the insolation probability in the calculation (step S70). Note that in the present embodiment, examples of three types of calculations with conditional branching have been illustrated, but the number of types of conditional branching of calculations is not limited.

Finally, in a case where the calculation target time is changed (updated) (Yes (Y) in step S80), the process moves to a state immediately before step S30. In a case where the calculation target time is not changed (updated) (No (N) in step S80), the process is ended.

Figure 4:
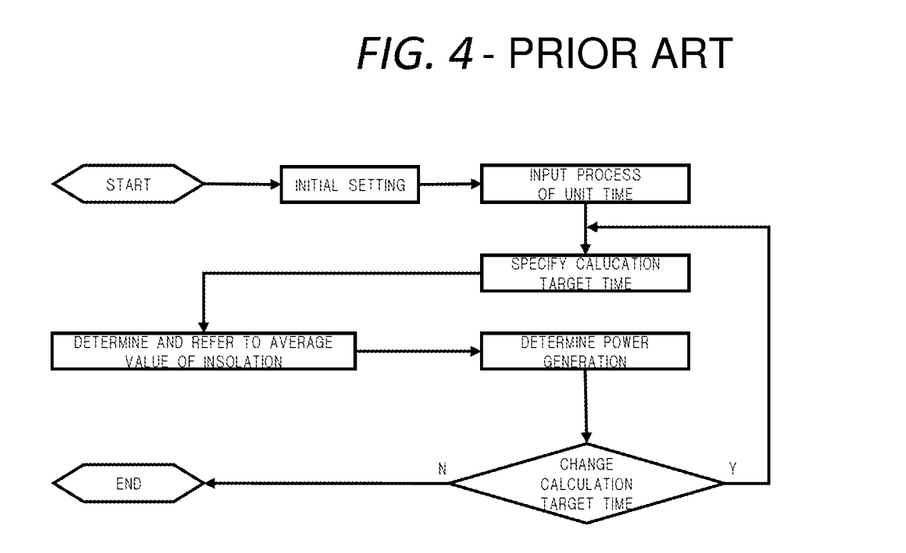
FIG. 4 is a process flowchart according to a conventional power generation prediction method.

FIG. 4 is a process flowchart of a power generation prediction in a conventional method. The process flowchart does not include a process step related to a determination of the insolation probability distribution and a process step related to the calculation with conditional branching. Since the calculation with conditional branching (step S60A) and the calculation with conditional branching (step S60C) in FIG. 2 are not included, there is a problem that it is not possible to properly consider a case where the power generation uniquely becomes a predetermined amount without depending on the insolation. The present invention is capable of solving the problem and achieving an accurate prediction of the power generation.

Figure 3:
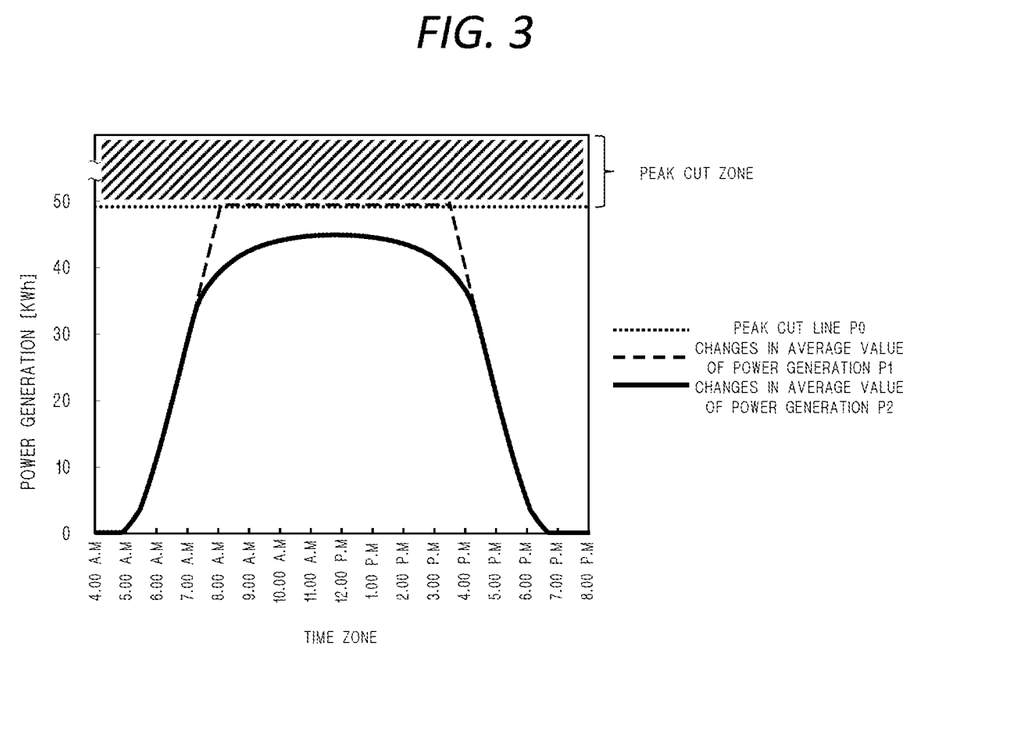
FIG. 3 is a graph illustrating a power generation prediction results according to the embodiment of the present invention.

FIG. 3 is a graph indicating a power generation prediction result. A numerical value of the power generation corresponding to the vertical axis of the graph illustrates an example. Note that the power generation prediction result may be configured to be subjected to the display process by the display means 22.

According to FIG. 3, changes in the average value of the power generation P1 and changes in the expected value of the power generation P2 indicate a prediction result based on the process flowchart related to the determination of the expected value of the power generation (FIG. 2) and a prediction result based on the process flowchart of the power generation prediction in the conventional method (FIG. 4), respectively. Note that the power generation characteristic data D20 and the output characteristic data D30 used in a calculation example of the changes in the average value of the power generation P1 (FIG. 3) are the same, respectively, as the power generation characteristic data D20 and the output characteristic data D30 used in and the changes in the expected value of the power generation P2 (FIG. 3).

As illustrated in FIG. 3, in the power generation prediction (corresponding to P1) in the conventional method illustrates a time zone in which the prediction result is near the peak cut line P0 appears, whereas in the method of the present invention (corresponding to P2), a time zone in which the prediction result is lower than the peak cut line P0 appears. This is because, as described above, in the method of the present invention, the expected value calculation in consideration of the case where the power generation uniquely becomes a predetermined amount without depending on the insolation is performed. Specifically, since the method of the present invention sequentially considers the case where the peak cut line P0 is instantaneously exceeded, it is possible to accurately predict the power generation from which the peak cut has been removed.

Note that in the present embodiment, the expected value of the power generation may be calculated using a mathematical model as an approximate expression based on the insolation probability distribution. The mathematical model is preferably based on a probability density function of 1 or more. Note that in the disclosed embodiment, the insolation probability indicates an insolation appearance probability. Note that in the disclosed embodiment, the insolation indicates a flux of insolation or an insolation amount. Note that in the disclosed embodiment, the insolation normalization indicates an insolation amount normalization. Note that in the disclosed embodiment, the power generation indicates an electric power generation amount.

REFERENCE SIGNS LIST

1 System
2 Computer apparatus
3 Power generation device
4 Output device
21 Input means
22 Display means
23 Management means
24 Insolation analysis means
25 Power generation prediction means
26 Profitability evaluation means
201 Arithmetic device
202 Main storage device
203 Auxiliary storage device
204 Input device
205 Display device
206 Communication device
301 Photoelectric conversion device
302 Communication device
401 Power conversion device
402 Communication device
2001 Program
2002 OS
C1, C2, C3 Condition
DB Database
D10 Insolation data
D20 Power generation characteristic data
D30 Output characteristic data
D40 Capital investment data
NW Network
P0 Peak cut line
P1 Changes in average value of power generation
P2 Changes in expected value of power generation
S10, S20, S30, S40, S50, S60A, S60B, S60C, S70, S80 Step

The invention claimed is:

1. An electric power generation prediction method, the method comprising:
a processor of a computer executing program instructions that when executed cause the processor to:
determine an insolation per unit time and an insolation probability per unit time on a basis of insolation data; and
determine a power generation on a basis of an insolation and determine an expected value of the power generation on a basis of a power generation per unit time and the insolation probability per unit time corresponding to the insolation, wherein on a basis of power generation characteristic data indicating the insolation and a power generation efficiency required to obtain minimum output power which is zero, and output characteristic data indicating capacity and output efficiency such that an excess becomes a peak cut loss, determine a first insolation that is the insolation required to obtain a first power generation that the minimum output power, and a second power generation that is the capacity which is a constant power generation at a peak cut line, on a basis of the second power generation and the power generation efficiency, determine a second insolation that is the insolation in a case where the constant power generation is obtained, in a case where the insolation is lower than the first insolation, determine the first power generation as the power generation, and in a case where the insolation exceeds the second insolation, determine the second power generation as the power generation.

2. An electric power generation prediction system comprising:

a processor of a computer; and program instructions that are executable by the processor that when executed cause the processor to:

determine an insolation per unit time and an insolation probability per unit time on a basis of insolation data; and determine a power generation on a basis of an insolation and determine an expected value of the power generation on a basis of a power generation per unit time and the insolation probability per unit time corresponding to the insolation, wherein on a basis of power generation characteristic data indicating the insolation and a power generation efficiency required to obtain minimum output power which is zero, and output characteristic data indicating capacity and output efficiency such that an excess becomes a peak cut loss, determine a first insolation that is the insolation required to obtain a first power generation that is the minimum output power, and a second power generation that is the capacity which is a constant power generation at a peak cut line, on a basis of the second power generation and the power generation efficiency, determine a second insolation that is the insolation in a case where the constant power generation is obtained, in a case where the insolation is lower than the first insolation, determine the first power generation as the power generation, and in a case where the insolation exceeds the second insolation, determine the second power generation as the power generation.

3. An electric power generation prediction program stored on a non-transitory computer-readable storage medium, wherein the electric power generation prediction program when executed causes a computer to:

determine an insolation per unit time and an insolation probability per unit time on a basis of insolation data; and determine a power generation on a basis of an insolation and determine an expected value of the power generation on a basis of a power generation per unit time and the insolation probability per unit time corresponding to the insolation, wherein on a basis of power generation characteristic data indicating the insolation and a power generation efficiency required to obtain minimum output power which is zero, and output characteristic data indicating capacity and output efficiency such that an excess becomes a peak cut loss, determine a first insolation that is the insolation required to obtain a first power generation that is the minimum output power, and a second power generation that is the capacity which is a constant power generation at a peak cut line, on a basis of the second power generation and the power generation efficiency, determine a second insolation that is the insolation in a case where the constant power generation is obtained, in a case where the insolation is lower than the first insolation, determine the first power generation as the power generation, and in a case where the insolation exceeds the second insolation, determine the second power generation as the power generation.

* * * * *